(12) United States Patent
Clay et al.

(10) Patent No.: US 9,668,491 B2
(45) Date of Patent: Jun. 6, 2017

(54) DIRECT CURRENT/ALTERNATING CURRENT POULTRY STUNNING AND IMMOBILIZING APPARATUS AND METHOD

(71) Applicant: SIMMONS ENGINEERING COMPANY, Dallas, GA (US)

(72) Inventors: Stephan A. Clay, Cedartown, GA (US); Derrick C. Arp, Blue Ridge, GA (US); Jeffrey L. Airey, Federalsburg, MD (US)

(73) Assignee: SIMMONS ENGINEEERING COMPANY, Dallas, GA (US)

( * ) Notice: Subject to any disclaimer, the term of this patent is extended or adjusted under 35 U.S.C. 154(b) by 0 days.

(21) Appl. No.: 15/170,145

(22) Filed: Jun. 1, 2016

(65) Prior Publication Data

US 2016/0345596 A1    Dec. 1, 2016

Related U.S. Application Data (60) Provisional application No. 62/169,097, filed on Jun. 1, 2015.

(51) Int. Cl.
*A22C 21/00* (2006.01)
*A22B 3/06* (2006.01)

(52) U.S. Cl.
CPC ............. *A22B 3/06* (2013.01); *A22C 21/00* (2013.01)

(58) Field of Classification Search
CPC ....... A22B 3/06; A22B 3/086; A22C 21/0015; A22C 9/002
USPC ...................................................... 452/58, 59
See application file for complete search history.

(56) References Cited

U.S. PATENT DOCUMENTS

| | | | | |
|---|---|---|---|---|
| 5,401,209 A | * | 3/1995 | Ripol | A22B 3/06 452/58 |
| 6,019,674 A | * | 2/2000 | Austin | A22B 3/06 452/58 |
| 7,740,527 B1 | * | 6/2010 | Harben | A22B 3/086 452/58 |
| 7,841,928 B2 | * | 11/2010 | Tseng | A22B 3/086 452/58 |

FOREIGN PATENT DOCUMENTS

| DE | 3152805 | 6/1983 |
|---|---|---|
| EP | 1258195 | 11/2002 |

OTHER PUBLICATIONS

International Search Report for PCT/US2016/035206 dated Aug. 30, 2016.

* cited by examiner

*Primary Examiner* — Richard Price, Jr.
(74) *Attorney, Agent, or Firm* — Gardner Groff Greenwald & Villanueva, P.C.

(57) ABSTRACT

A poultry stunning apparatus and method, the apparatus including an electrical control module configured to apply a DC current to the poultry at a voltage sufficient to stun the poultry and to apply AC current to the stunned poultry at a voltage and for a period of time sufficient to immobilize and relax the muscles of the stunned poultry, while at the same time avoiding or minimizing damage to the poultry tissue. In the method, DC voltage/current is applied for initial stunning, followed by an AC voltage/current to immobilize poultry and to further relax the muscles of the stunned poultry, such that the poultry does not exhibit involuntary motions, while at the same time avoiding or minimizing damage to the poultry tissue.

10 Claims, 7 Drawing Sheets

DIRECT CURRENT/ALTERNATING CURRENT POULTRY STUNNING AND IMMOBILIZING APPARATUS AND METHOD

CROSS-REFERENCE TO RELATED APPLICATION

This application claims the priority benefit of U.S. Provisional Patent Application 62/169,097 filed Jun. 1, 2015, which is hereby incorporated herein by reference.

BACKGROUND

In slaughtering poultry, it is common to first stun the poultry, then kill the stunned poultry, and then to process the killed poultry. In stunning the poultry, it is desirable to avoid damaging the poultry tissue and to minimize movement of the poultry.

In known prior stunner systems, a pulsating low DC voltage has been applied. The pulsating DC voltage, usually in the 10-14 volt range for chickens, 14-18 volts for small turkeys, and 30-35 volts for larger turkeys, works well for most poultry processors. However such pulsating DC voltages are not acceptable for those localities requiring a so-called "stun-to-kill" approach.

In general, most stunners used outside North America are based upon a design developed in Western Europe. These European stunners operate as "water bath" stunners. This means that the birds' heads and necks are dragged through a tank of electrically charged water. This results in a very inconsistent stun, and, when combined with European style killing machines which cut only one side of the bird's neck, results in birds still being alive when reaching the scalder. This is the main reason that many European countries now require the "stun-to-kill" practice.

However, when a bird is killed in a stunner with electrical current, there is a very strong possibility of causing damage to the carcass, such as broken bones and hemorrhaging of blood vessels. Poultry processors have been looking for alternative stunning methods to improve the "stun-to-kill" procedure so that the birds can be stunned with less resulting product damage.

U.S. Pa. No. 6,019,674 of Simmons provided a step forward in the art. As described in his patent, a saline solution is contained in an elongated trough, which is mounted at the end portions of four non-electronically conducting posts. The trough is filled with saline solution. The trough has an ingress funnel arrangement designed to control the thrashing of to-be-electrically stunned birds and an elongated grid having a portion immersed in the solution and a downstream portion out of the solution. The four posts extend upwardly and terminate in threaded portions. A frame carriage is provided which has four corners, and at the four corners are suitably mounted driven gears with internal bores and threads adapted to engagingly rotate about the threaded portions of the ports. The carriage is suitably affixed to a conventional I-beam to which is movingly mounted a conventional endless cable and space shackle system for conveying birds in an upside down manner. The four mounted gears are rotatable in unison by a chain drive which may be manual, hydraulic, pneumatic or electric, whereby the trough may be selectively moved upwardly or downwardly as found necessary to vary the distance between the said I-beam and said trough to accommodate different sized shackles and/or birds.

The trough has a short extension bolted there onto to provide a first section and a second section. Both sections include a grate through which and across the top there of the bird's head is dragged.

In the first section, a pulsating DC current operating at a relatively low voltage (9-30 volts) is applied via an electrical connection, such that electricity is applied to a grate in each section. The overhead shackle line carrying the birds is at a polarity which is opposite to the polarity of electricity being supplied to the stainless steel surface submerged in saline solution and the trough. In the second section, a low AC current operating at about 30 volts is applied via the electrical connection between the shackles and the trough. The second section of the extension is electrically isolated from the first section of the main or first section of the trough. The speed of the conveyer is such that the poultry are subjected to the low voltage AC current in the extension for a period of only about two to three seconds.

While the apparatus and method described in U.S. Pat. No. 6,019,674 are effective to stun a bird such that it is unconscious, the bird is likely to still exhibit undesirable involuntary motion.

SUMMARY OF THE INVENTION

According to an illustrative embodiment, a DC voltage/current is applied for initial stunning, followed by an AC voltage/current to immobilize poultry and to further relax the muscles of the stunned poultry, such that the poultry does not exhibit involuntary motions, while at the same time avoiding or minimizing damage to the poultry tissue.

In one example embodiment, an apparatus comprises a poultry stunning apparatus, including an electrical control module configured to apply a DC current to the poultry at a voltage sufficient to stun the poultry and to apply AC current to the stunned poultry at a voltage and for a period of time sufficient to immobilize and relax the muscles of the stunned poultry, while at the same time avoiding or minimizing damage to the poultry tissue.

Optionally, the AC current is applied at a medium voltage of between about 60 and 250 VAC. Preferably, the AC current is applied at a voltage of between about 60 and 130 VAC. Most preferably, the AC current is applied at a voltage of between about 70-90 VAC.

Preferably, the AC voltage/current is applied with a dwell time between about 2 and 5 seconds.

Optionally, the AC voltage/current is applied at a frequency of about 50-60 Hz.

In another example embodiment, the invention relates to a method for stunning poultry, including the steps of applying a DC current to poultry at a voltage sufficient to stun the poultry; and applying an AC current to the stunned poultry at a voltage and for a period of time sufficient to immobilize and relax the muscles of the stunned poultry, while at the same time avoiding or minimizing damage to the poultry tissue.

DETAILED DESCRIPTION

With reference now to the drawing figures, wherein like reference numbers represent corresponding parts throughout the several views, FIGS. 1-5 show a direct current/alternating current poultry stunning and immobilizing apparatus 10 according to an example embodiment of the present invention. The device generally includes a stunner cabinet 11, an overhead support frame 12, and kill line shackles 13 attached to a pre-existing overhead track 14. Such an overhead track 14 is a common feature in many poultry processing plants.

According to an illustrative embodiment, an apparatus and method are provided for applying a low voltage DC current to poultry to stun the poultry and then applying an AC current to the poultry at a sufficient voltage and for a sufficient period of time to immobilize the poultry without damaging the tissue.

Figure 1:
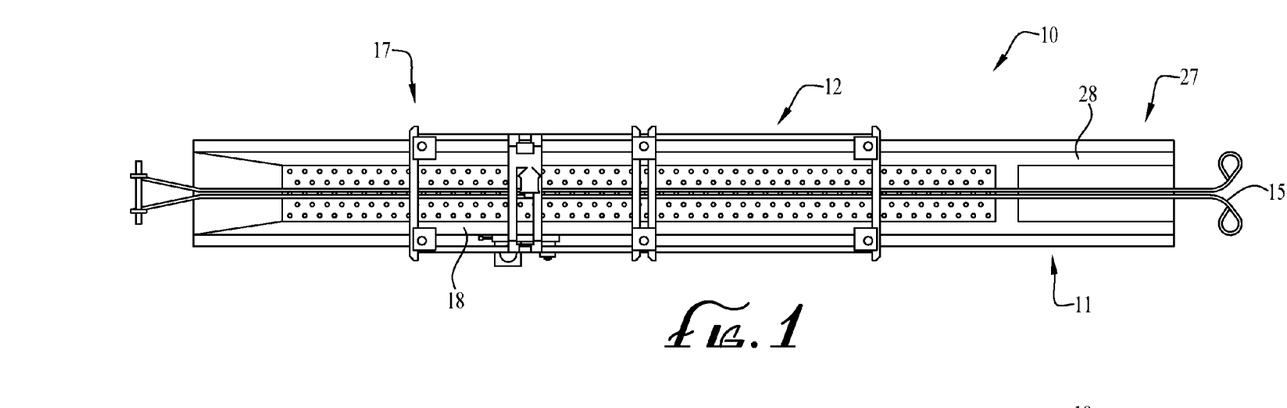
FIG. 1 is a top view of a stunning apparatus according to an example embodiment of the present invention.
Figure 2:
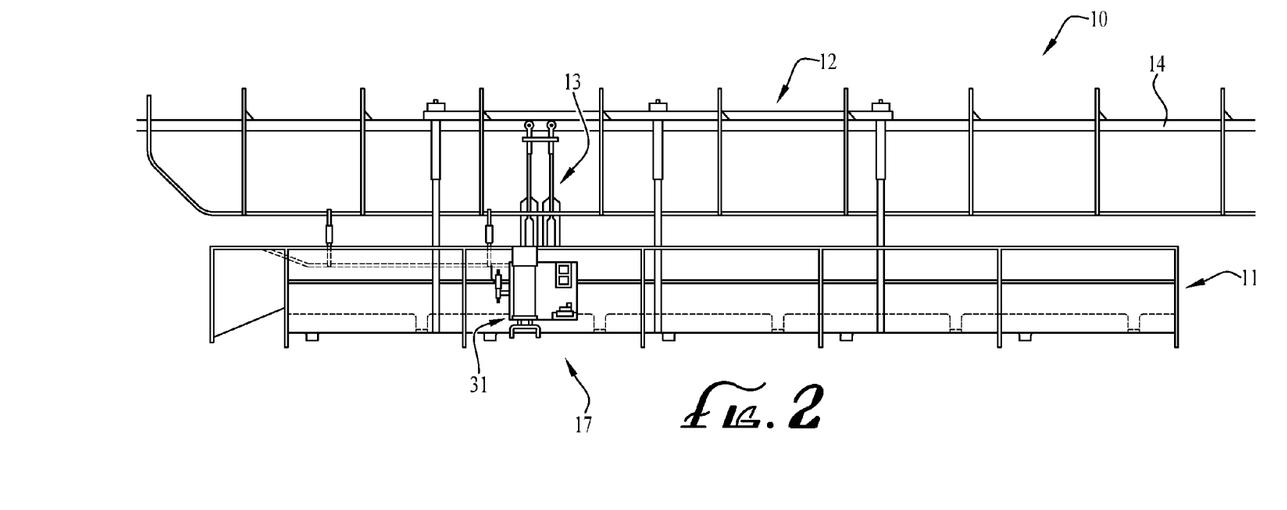
FIG. 2 is a side view of a stunning apparatus according to FIG. 1.
Figure 3:
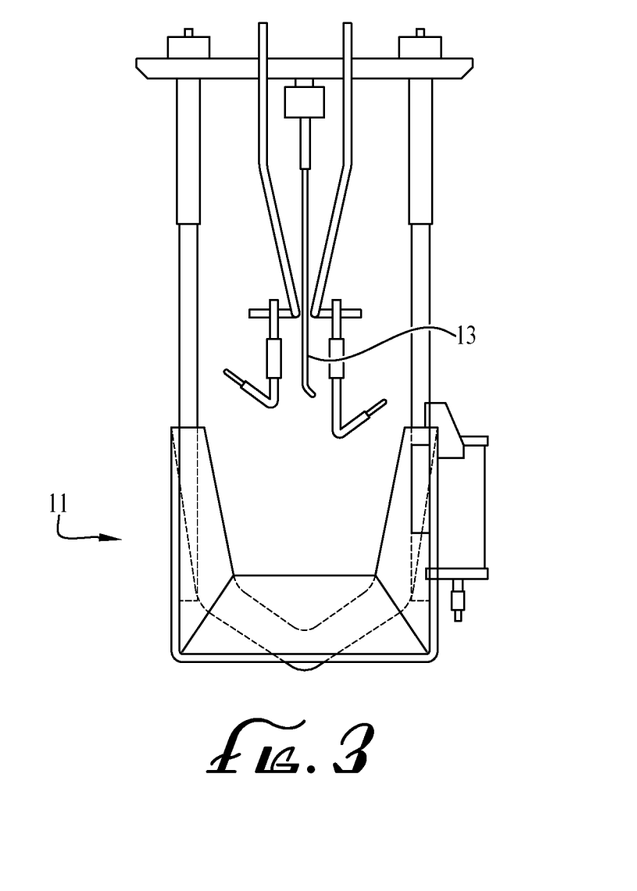
FIG. 3 is an end view of a stunning apparatus of FIG. 1.
Figure 4:
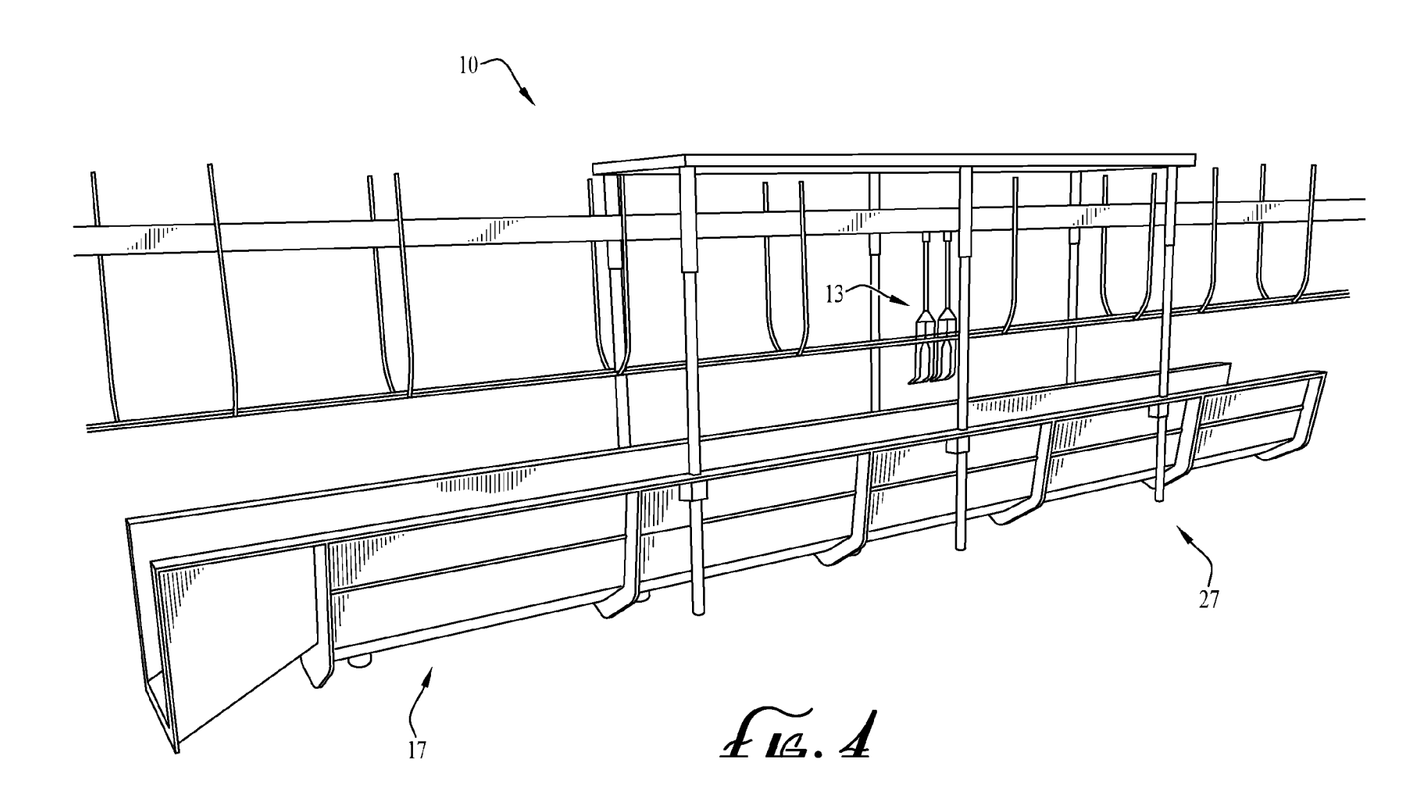
FIG. 4 is a perspective view of a stunning apparatus according to an example embodiment.
Figure 5:
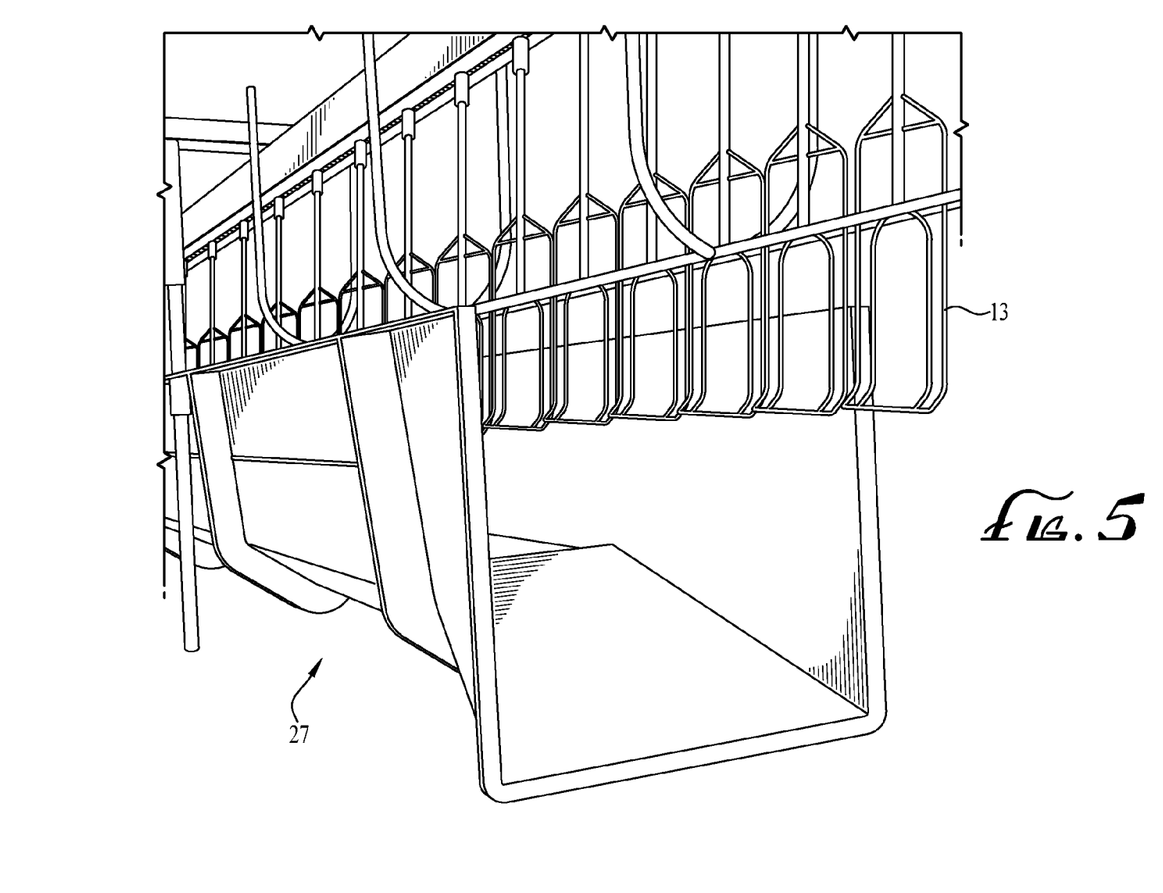
FIG. 5 is a perspective view of a stunning apparatus of FIG. 4.

Referring to FIGS. 1 and 2, which show a top and side view of the poultry stunning device 10, show the stunner cabinet 11 which forms an elongated U-shaped basin (see FIGS. 3-5). The stunner cabinet 11 is open at each end to allow poultry to enter the cabinet 11 at a first end and exit at the second end. The cabinet 11 includes a DC stunner portion 17, situated near the first end of the cabinet, and an AC stunner portion 27, situated near the second end of the cabinet. The DC stunner portion 17 includes a recessed area capable of retaining water. The DC stunner portion 17 also includes a DC stunner contact grate 18. In example embodiments, the DC stunner grate 18 is positioned at the bottom of the recessed area of the DC stunner portion 17. The AC stunner portion 27 likewise includes an AC stunner contact grate 28. The DC stunner grate 18 and the AC stunner grate 28 are made of electrically conductive material, such as stainless steel. The DC stunner contact grate 18 and the AC stunner contact grate 28 are electrically isolated from each other. The power supplies coupled to the DC stunner contact grate 18 and the AC stunner contact grate 28 are protected, for example, by a NEMA 4x stainless steel enclosure.

The stunner cabinet 11 also includes a salt water injection system 31 located in the DC stunner portion 17. The salt water injection system 31 is designed to fill and maintain a level of salt water in the recessed area of the DC stunner portion 17. The salt water injection system 31 can include an optional electronic control to ensure the salt water contains the proper saline level for delivering electric current. The cabinet 11 can include an optional pneumatic adjustment system to adjust the height of the cabinet 11 such that it can accommodate a variety of types and sizes of poultry.

The apparatus 10 also includes an overhead support frame 12 to support an existing overhead track. The overhead support frame 12 supports an overhead conveying track to which kill line shackles 13 are connected, as shown in FIGS. 2 and 3. The kill shackles 13 are made of electrically conductive material and are designed to support poultry in an inverted position so that the bird hangs upside down with the bird's head oriented toward the bottom of the stunner cabinet 11. The overhead support frame 12 and overhead track 14 are suitably affixed to a guide bar system 15, which is movingly mounted to a conventional endless cable and space shackle system for conveying birds in an upside down manner in a manner understood by those skilled in the art. Optionally, an insulated rump bar and breast bar can also be used to support and hold poultry in an inverted position. In other embodiments, the apparatus can include an optional guide bar kit for accommodating plastic shackles.

The apparatus 10 can be of a modular construction which allows for additional sections to be added without replacing the entire system. The apparatus can also include a digital display and/or a voltage data logger.

Figure 6A:
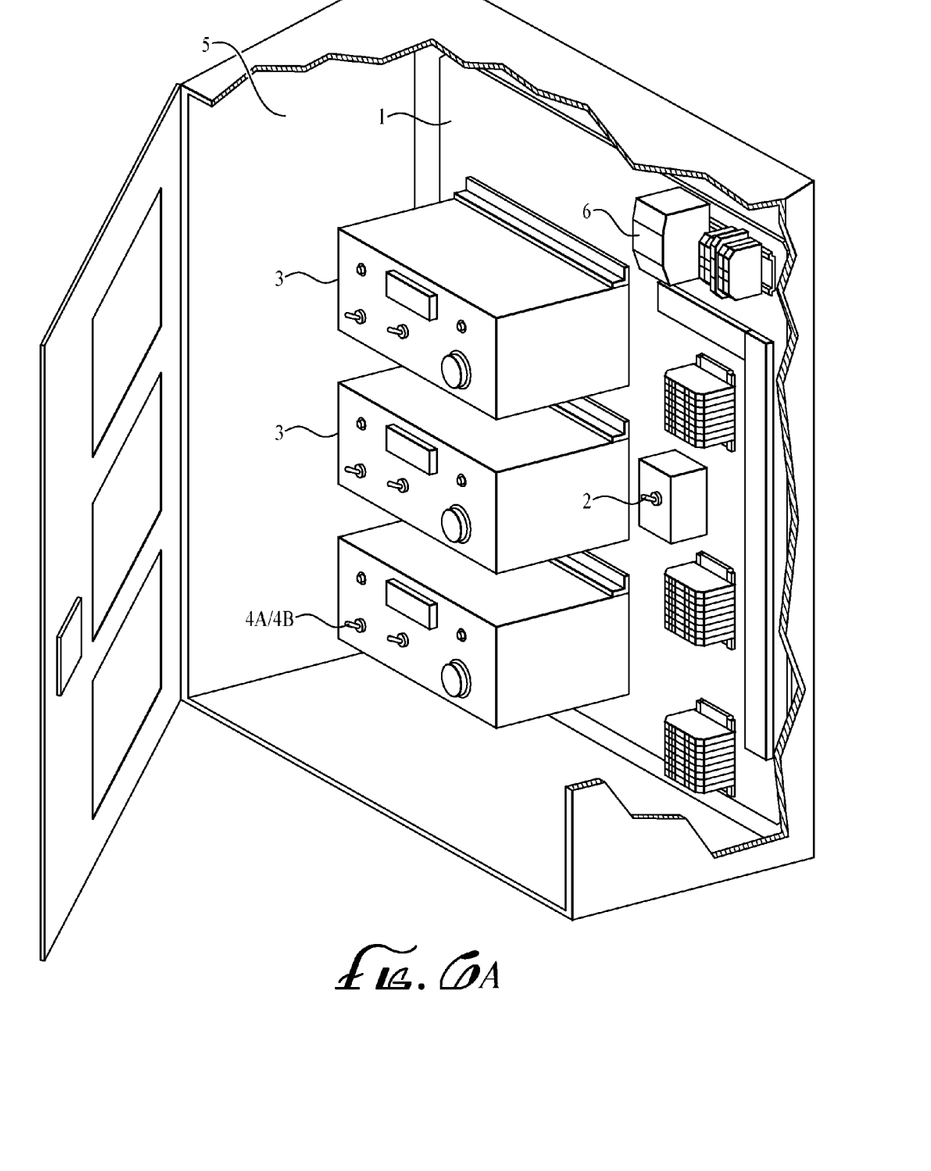
FIG. 6A is a perspective view of an electronics housing portion of the stunning apparatus of FIG. 1 and contents thereof.
Figure 6B:
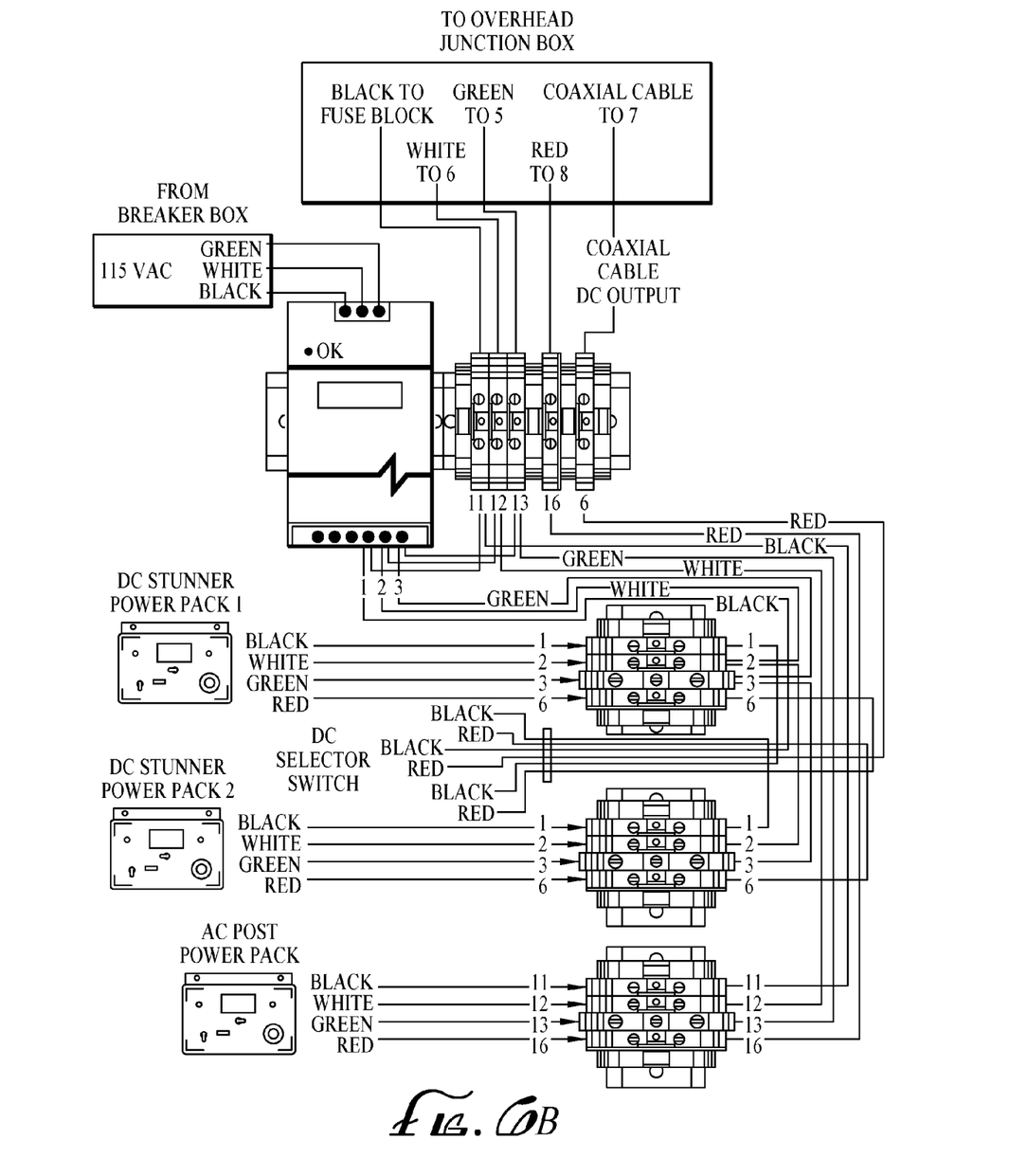
FIG. 6B is a schematic view of a wiring diagram of the electronics housing and contents thereof of FIG. 6A.

As shown in FIGS. 6A and 6B, the stunner control panel consists of a NEMA 4X stainless steel enclosure containing (2) Simmons DC power packs and (1) Simmons AC power pack. Also included in the panel is (1) power conditioner and (1) primary/secondary DC power pack selector switch.

The DC power pack operates by converting standard AC voltage (115-120 VAC) to low voltage high frequency DCV. The DC voltage and amperage are displayed through a digital display located on the face of the DC power pack enclosure. The DC power pack also includes a variable transformer to raise or lower the voltage going to the DC stunner grate and an on/off switch. The AC power pack uses standard AC voltage as an input (115-120 VAC). The applied voltage is displayed through a digital display located on the face of the AC power pack enclosure. The AC power pack also includes a variable transformer to raise or lower the voltage going to the AC stunner grate and an on/off switch.

The stunner controller operates to control the DC and AC voltages applied to the bird, as described herein.

In operation, the legs of poultry are connected to the kill line shackles 13, and the poultry is conveyed upside down along the overhead track 14 from the DC stunner contact grate 18 towards the AC stunner contact grate 28. The salt water injection system 31 injects a sufficient amount of salt water into the DC stunner section 17 of the stunner cabinet 11 such that, as the poultry is conveyed along the overhead track 14, the head of the poultry is sufficiently submerged in the salt water to cause an electrical connection for a pulsating DC current to flow from the DC stunner grate 18 to the kill shackles 13. This electrical connection enables the pulsating DC current to flow through the poultry such that the poultry is stunned effectively.

According to an illustrative embodiment, as the poultry is conveyed toward the AC stunner contact grate 28, the head of the poultry emerges from the salt water solution. As the head of the poultry comes into contact with the AC stunner contact grate 28, the head of the poultry is damp enough to create an electrical pathway through the poultry for the AC current to flow from the AC stunner grate 28 to the kill shackles 13, such that the poultry is immobilized.

The strength (voltage) of the DC current, the strength (voltage) of the AC current, and the dwell time of the AC current may be varied depending upon, e.g., the size of the poultry, etc. For example, the DC current may be applied as a pulsating square wave with peaks between zero volts and about 60 volts (0 VDC and 60 VDC). Preferably, the DC voltage is cycled as a square wave with a frequency of about 500 Hz (cycles per second), with a duty cycle of about 25%, resulting in an average DC voltage of about 15 VDC.

Optionally, the AC current is applied at a medium voltage of between about 60 and 250 VAC. Preferably, the AC current is applied at a voltage of between about 60 and 130 VAC. Most preferably, the AC current is applied at a voltage of between about 70-90 VAC.

Ideally, the lowest AC current is about 70 VAC. It should be appreciated that lower AC currents may also work to immobilize the poultry, but not as effectively. Preferably, the dwell time (time of application of the AC current) is between about 2 and 10 seconds, and most preferably is between about 2 and 5 seconds. Preferably, the AC current is provided at a frequency of about 50-60 Hz.

According to an illustrative embodiment, the application of DC current followed by AC current in the manner described above is effective to stun and then immobilize poultry and to relax the muscles of the stunned poultry, while at the same time avoiding or minimizing damage to the poultry tissue. This results in a generally "irreversible stun" from which poultry would not normally recover.

Figure 7:
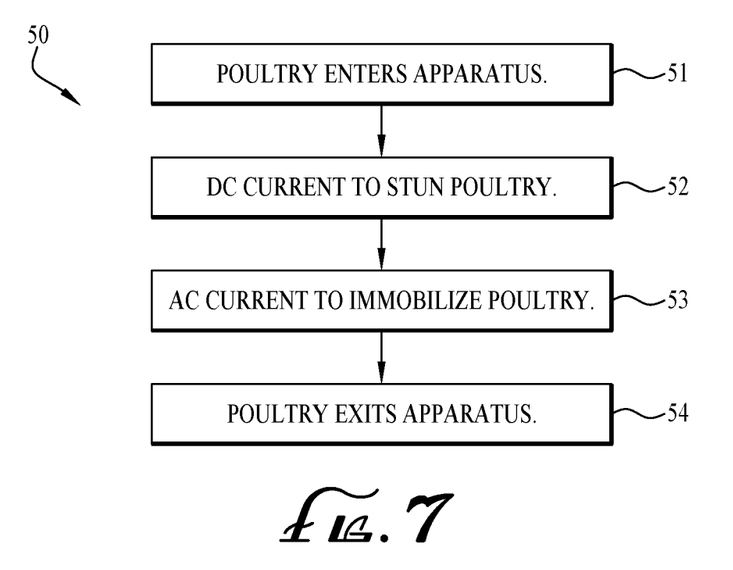
FIG. 7 is a schematic flow chart of a method of operation of the stunning apparatus of FIG. 1.

In a preferred form, the present invention relates to a method 50 as shown in FIG. 7, in which according to a first step 51 the bird is passed through the stunner apparatus. In the second step 52, the DC voltage is applied to stun the bird. In the third step 53, the AC voltage is applied to immobilize the bird. And in the fourth step 54, the bird exits the stunner apparatus.

We claim:

1. A poultry stunning apparatus, comprising:
an electrical control module configured to apply a DC current to the poultry at a voltage sufficient to stun the poultry and to apply AC current to the stunned poultry at a voltage and for a period of time sufficient to immobilize and relax the muscles of the stunned poultry, while at the same time avoiding or minimizing damage to the poultry tissue, wherein the AC current is applied at a medium voltage of between about 60 to 250 VAC.

2. The poultry stunning apparatus of claim 1, wherein the AC current is applied at a medium voltage of between about 60-130 VAC.

3. The poultry stunning apparatus of claim 1, wherein the AC current is applied at a medium voltage of about 70-90 VAC.

4. The poultry stunning apparatus of claim 1, wherein the AC voltage/current is applied at a medium voltage with a dwell time between about 2 and 5 seconds.

5. The poultry stunning apparatus of claim 1, wherein the AC voltage/current is applied at a frequency of about 50-60 Hz.

6. A method for stunning poultry, comprising:
applying a DC current to poultry at a voltage sufficient to stun the poultry;
applying an AC current to the stunned poultry at a voltage and for a period of time sufficient to immobilize and relax the muscles of the stunned poultry, while at the same time avoiding or minimizing damage to the poultry tissue, wherein the AC current is applied at a medium voltage of between about 60 to 250 VAC.

7. The method of claim 6, wherein the AC current is applied at a medium voltage of between about 60-130 VAC.

8. The method of claim 6, wherein the AC current is applied at a medium voltage of about 70-90 VAC.

9. The method of claim 6, wherein the AC voltage/current is applied at a medium voltage with a dwell time between about 2 and 5 seconds.

10. The method of claim 6, wherein the AC voltage/current is applied at a frequency of about 50-60 Hz.

* * * * *